(12) United States Patent
Wang et al.

(10) Patent No.: US 10,972,726 B2
(45) Date of Patent: Apr. 6, 2021

(54) TECHNIQUES TO DYNAMICALLY SELECT A VIDEO ENCODER FOR STREAMING VIDEO ENCODING

(71) Applicant: WhatsApp Inc., Menlo Park, CA (US)

(72) Inventors: YuanYuan Wang, Sunnyvale, CA (US); Manpreet Singh, Los Altos Hills, CA (US)

(73) Assignee: WHATSAPP INC., Menlo Park, CA (US)

(*) Notice: Subject to any disclaimer, the term of this patent is extended or adjusted under 35 U.S.C. 154(b) by 6 days.

(21) Appl. No.: 15/721,496

(22) Filed: Sep. 29, 2017

(65) Prior Publication Data

US 2019/0104306 A1 Apr. 4, 2019

(51) Int. Cl.
| | |
|---|---|
| H04N 19/156 | (2014.01) |
| H04N 19/184 | (2014.01) |
| H04N 19/164 | (2014.01) |
| H04N 19/12 | (2014.01) |
| H04N 19/179 | (2014.01) |
| H04N 21/24 | (2011.01) |
| H04N 21/4788 | (2011.01) |
| H04N 21/2343 | (2011.01) |
| H04N 19/115 | (2014.01) |

(52) U.S. Cl.
CPC .......... *H04N 19/115* (2014.11); *H04N 19/12* (2014.11); *H04N 19/156* (2014.11); *H04N 19/164* (2014.11); *H04N 19/179* (2014.11); *H04N 19/184* (2014.11); *H04N 21/234309* (2013.01); *H04N 21/2402* (2013.01); *H04N 21/4788* (2013.01)

(58) Field of Classification Search
CPC .................................................... H04N 19/164
See application file for complete search history.

(56) References Cited

U.S. PATENT DOCUMENTS

| | | | |
|---|---|---|---|
| 6,704,281 B1* | 3/2004 | Hourunranta | H04N 7/52 370/230 |
| 2008/0207253 A1* | 8/2008 | Jaakkola | H04B 17/345 455/550.1 |
| 2013/0034146 A1* | 2/2013 | Jeong | H04N 19/166 375/240.01 |

(Continued)

*Primary Examiner* — Jayanti K Patel
*Assistant Examiner* — Christopher Kingsbury Glover
(74) *Attorney, Agent, or Firm* — Kacvinsky Daisak Bluni PLLC

(57) ABSTRACT

Techniques to dynamically select a video encoder for streaming video encoding are described. For example, in one embodiment, an apparatus may include an encoding configuration component operative to receive network performance information for a video stream at a sending device, the video stream at a first video bitrate with a first video encoding codec, and assign a second video bitrate with a second video encoding codec to a media component based on the network performance information, wherein the second video encoding codec is used based on generating the video stream at the second video bitrate, the media component operative to generate the video stream at the sending device at the second video bitrate with the second video encoding code, and the network component operative to send the video stream from the sending device to the receiving device using the second video encoding codec. Other embodiments are described and claimed.

21 Claims, 10 Drawing Sheets

(56) References Cited

U.S. PATENT DOCUMENTS

2013/0058232 A1\* 3/2013 Wurm .................. H04N 19/156
370/252
2018/0234467 A1\* 8/2018 Dowlatkhah ....... H04L 65/1069

\* cited by examiner

400A

Generate a video stream at a sending device at a first video bitrate with a first video encoding codec
402

Send the video stream from the sending device to a receiving device
404

Receive network performance information for the video stream
406

Determine a second video bitrate based on the network performance information for the video stream
408

Generate the video stream at the sending device at the second video bitrate with a second video encoding codec, wherein the second video encoding codec is used based on generating the video stream at the second video bitrate
410

Send the video stream from the sending device to the receiving device using the second video encoding codec
412

```
Receive a video stream initiation between a sending device
and a receiving device at a messaging server device
422
```

```
Send a video codec selection policy from the messaging
server device to the sending device
424
```

```
Receive a video stream at a messaging server device from the
sending device, the video stream generated at the sending
device at a first video bitrate with a first video encoding
codec, the first video encoding codec selected based on the
video codec selection policy
426
```

```
Send the video stream to a receiving device
428
```

```
Receive a video stream at a messaging server device from the
sending device, the video stream generated at the sending
device at a second video bitrate with a second video encoding
codec, the second video encoding codec selected based on the
video codec selection policy
430
```

```
Send the video stream to the receiving device, the video
stream using the second video encoding codec selected based
on the video codec selection policy
432
```

*FIG. 4B*

TECHNIQUES TO DYNAMICALLY SELECT A VIDEO ENCODER FOR STREAMING VIDEO ENCODING

BACKGROUND

Users of mobile devices, such as smartphones, may use their mobile devices to execute applications. These applications may perform communications and network tasks on behalf of their user. An application may comprise a messaging client for communication between users. This communication may include the transmission of streaming content, including streaming combined video and audio content such as a video call exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to dynamically select a video encoder for streaming video encoding. In one embodiment, an apparatus may comprise an encoding configuration component operative to receive network performance information for a video stream at a sending device, the video stream at a first video bitrate with a first video encoding codec, and assign a second video bitrate with a second video encoding codec to a media component based on the network performance information, wherein the second video encoding codec is used based on generating the video stream at the second video bitrate, the media component operative to generate the video stream at the sending device at the second video bitrate with the second video encoding code, and the network component operative to send the video stream from the sending device to the receiving device using the second video encoding codec. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4A illustrates an embodiment of a first logic flow for the system of FIG. 1.

FIG. 4B illustrates an embodiment of a second logic flow for the system of FIG. 1.

DETAILED DESCRIPTION

Figure 1:
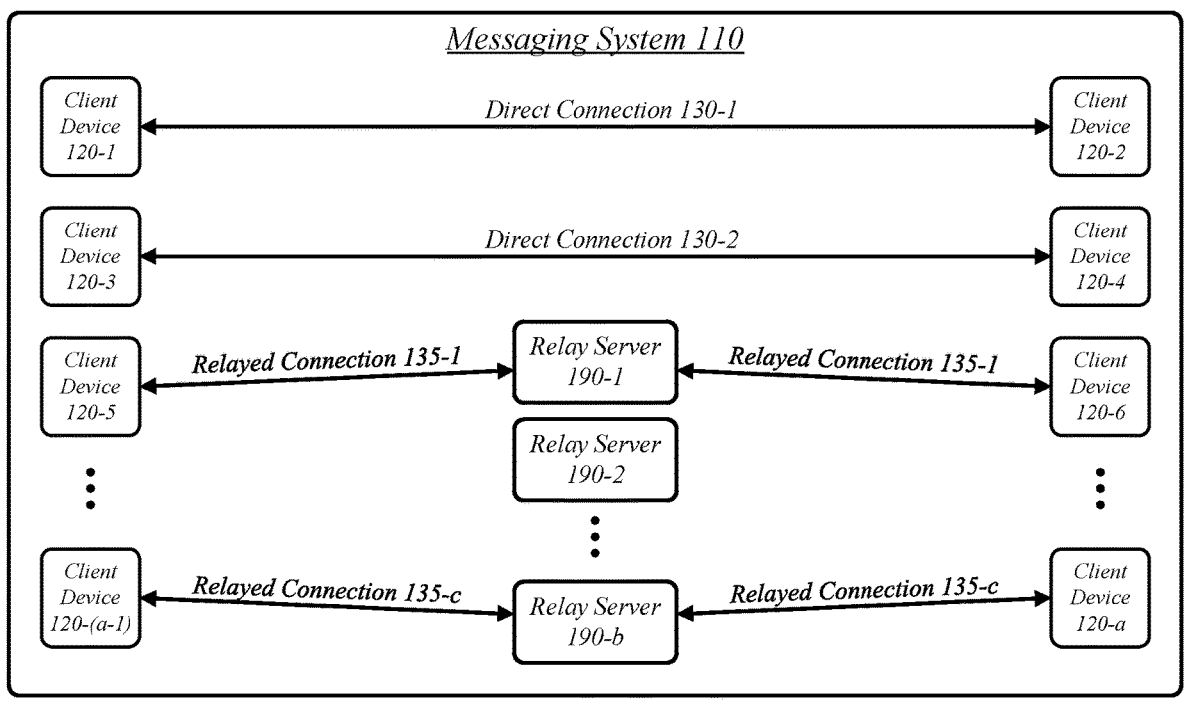
FIG. 1 illustrates an embodiment of a streaming media system.

Users may stream media content from their devices. This may include media content captured locally on a mobile device, for instance, the streaming of live audio and video during a video call. It may also include media content stored on the mobile device, such as a video stored locally.

The streaming of media content may be performed based on the configuration of media encoders responsible for the encoding of the streaming media content. For instance, the media content may be encoded in order to fit within a bitrate limit defined by a target bitrate, with the target bitrate thereby serving as a maximum limit for the encoding of media content. The media content may be encoded according to configuration of one or more encoding modes.

The media content may be encoded using a selected media encoder of a plurality of media encoders. For example, a sending client device may have both a hardware media encoder and one or more software media encoders. The hardware media encoder may perform well in high-bandwidth scenarios, using less power and processing resources than a software encoder when high-quality media encodings are being produced, but perform poorly in low-bandwidth scenarios by producing low-quality media encodings and poorly regulating itself to stay within bandwidth caps. A software media encoder may perform well in low-bandwidth scenarios, producing relatively high-quality encodings given the bandwidth limit and obeying the bandwidth limit, but perform poorly in high-bandwidth scenarios by using considerable power and processing resources.

The receiving client device may receive a media stream and provide it to a demultiplexer that, for each incoming packet, identifies the media codec that the contents of the incoming and provides it to the appropriate media decoder. It will be appreciated that a codec encoded by a hardware encoded may be decoded by a software decoder and vice-versa, as well as hardware decoder decoding hardware-encoded streams and software decoder decoding software-encoded streams.

The selection of an encoder may be determined based on the gathering of network performance information in order to prevent overwhelming a network connection and to avoid poor video playback performance due to dropped frames. An overwhelmed network connection may result in delay or periodic interruption in the delivery of the media content, which may result in unsatisfactory playback of the media content, particularly where the media content is immediate and live and particularly where the media content is part of an interactive exchange (e.g., an interactive audio or video call). Proper determination of encoding settings may therefore improve the video playback experience for the receiver of a video stream.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a streaming media system 100. In one embodiment, the streaming media system 100 may comprise a computer-implemented system having software applications comprising one or more components. Although the streaming media system 100 shown in FIG. 1 has a limited number of elements in a certain topology, it may be appreciated that the streaming media system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls.

A plurality of client devices 120 may operate as part of the streaming media system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Streaming network connections within the messaging system 110 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the messaging system 110, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Streaming media system 100 may include an authorization server (or other suitable component(s)) that allows users to opt in to or opt out of having their actions logged by streaming media system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of streaming media system 100 and other elements of a messaging system through blocking, data hashing, anonymization, or other suitable techniques as appropriate. For instance, a user may be empowered to configure privacy settings determining whether network usage, such as streaming communication, is logged by the streaming media system 100 and analyzed. In some embodiments, a user may be presented with information regarding may be collected and how that information may be used, such as informing the user that collected information may be anonymized prior to analysis.

Figure 2:
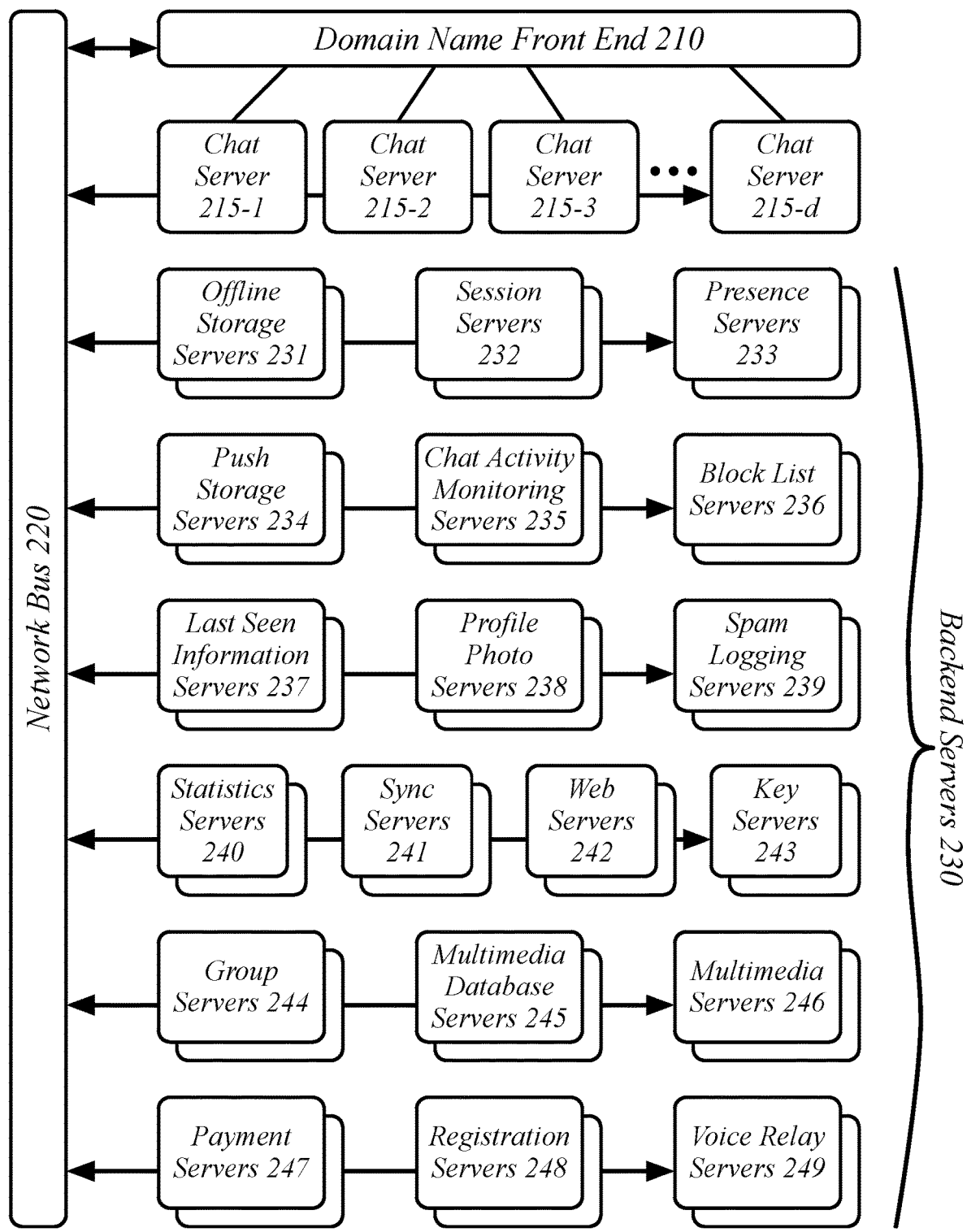
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming media system 100 with the operations of the streaming media system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the streaming media system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
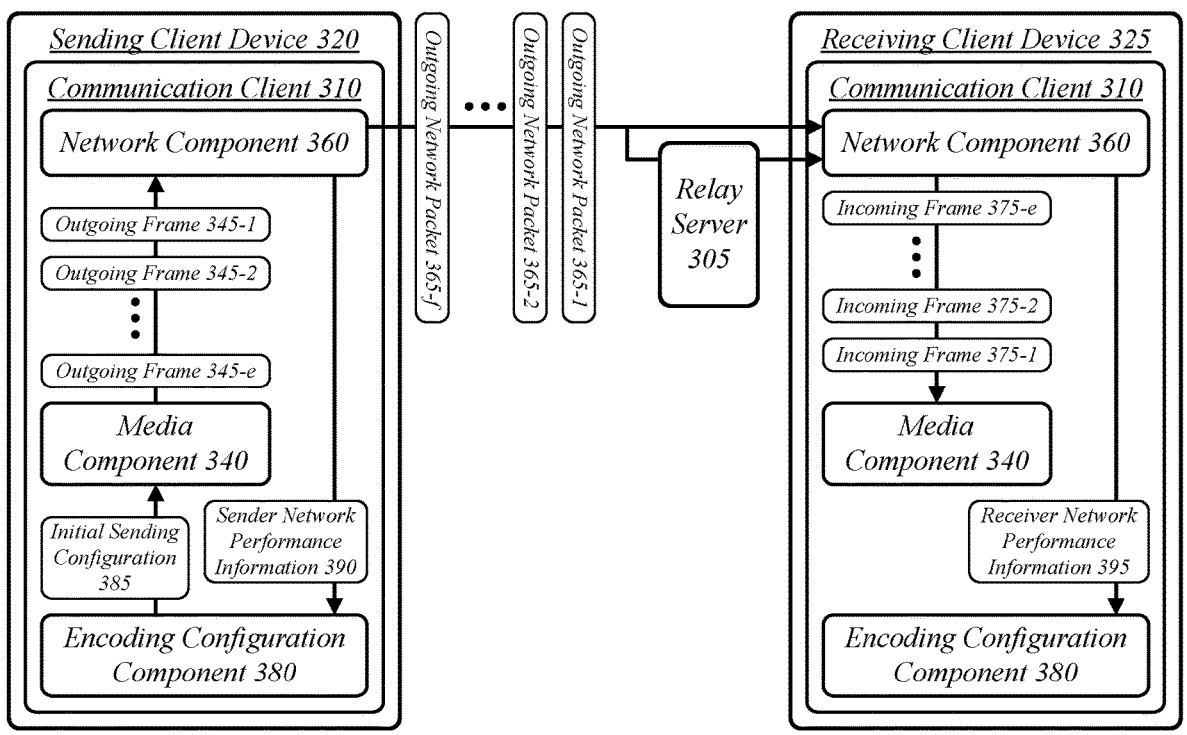
FIG. 3 illustrates an embodiment of a streaming media system with a sending client device sending a sequence of outgoing frames to a receiving client device.

FIG. 3 illustrates an embodiment of a streaming media system 100 with a sending client device 320 sending a sequence of outgoing frames 345 to a receiving client device 325.

A sending client device 320 may engage in a streaming network connection with a receiving client device 325 carrying a media stream. Each of the sending client device 320 and receiving client device 325 may execute an instantiation of a communication client 310. In some cases, the client devices 320, 325 may execute instantiations of different communication clients that conform to a sufficiently common specification to empower interoperability. In some embodiments, the communication client 310 may comprise a messaging client offering media streaming communication services.

In some cases, the streaming network connection may be a direct connection in which the outgoing network packets 365 from the sending client device 320 are addressed to the public-facing address associated with the receiving client device 325 and the outgoing network packets from the receiving client device 325 are addressed to the public-facing address associated with the sending client device 320. In other cases, the streaming network connection may be a relayed connection in which the outgoing network packets from the sending client device 320 and receiving client device 325 are addressed to a relay server 305, with the relay server 305 operative to forward network packets received from one client device to the other client device. A relay server 305 may comprise one relay server of a plurality of relay servers 190 provided as part of a messaging system 110.

A communication client 310 may comprise a network component 360, the streaming component generally arranged to establish and carry out the performance of a streaming network connection carrying streaming media content as a media stream. The streaming network connection may comprise a sequence of network packets, such as outgoing network packets 365. A network packet may comprise a user datagram protocol (UDP), a real-time transport protocol (RTP), or transmission control protocol (TCP) addressed using the internet protocol (IP), thereby forming UDP/IP, RTP/UDP, or TCP/IP packets. In some embodiments, UDP/IP may be preferentially used as it may be preferable to miss a packet than introduce the additional delay of requesting and receiving a replacement to a missed packet. In various embodiments, the outgoing network packets 365 may be include a video encoding codec identifier configured to indicate a video encoding codec of a video stream being transmitted via the outgoing network packets 365. For example, at least a portion of the outgoing network packets 365 may include RTP packets having encoding information (for instance, video encoding codec identifiers) in headers of outgoing network packets 365.

The communication client 310 may comprise a media component 340. The media component 340 is generally arranged to manage the generation of the media stream using assigned encoding settings. The media component 340 may interoperate with an encoding component to produce a series of outgoing frames 345. The outgoing frames 345 may comprise audio and/or video frames. An outgoing media frame, such as an audio frame or video frame, may comprise a portion of the media stream over a particular extent of time in which the media content during that period is bundled for decoding as a unit.

The encoding component may comprise a hardware encoding component of the sending client device 320. In some embodiments, a hardware encoding component may include an encoding component operative to encode video and/or audio according to the H.264 (MPEG-4 Part 10, Advanced Video Coding (MPEG-4 AVC) encoding standard and modifications and revisions thereto. The encoding component may comprise a software encoding component of the communication client 310, the operating system of the sending client device 320, or other software encoding component available to the communication client 310. In various embodiments, the software encoding component may include an encoding component operative to encode video and/or audio according to the VP8 and/or VP9 encoding standards and modifications and revisions thereto. Although H.264, VP8, and VP9 are provided as examples herein, embodiments are not so limited as any type of hardware or software encoding component capable of operating according to some embodiments is contemplated herein.

The media component 340 is operative to generate a media stream at a sending client device 320, the media stream comprising a video stream and an audio stream. The media stream is configured for a sending bitrate. The media stream being configured for the sending bitrate may comprise an assignment of encoding settings to the encoding component. In other embodiments, the media component 340 may perform the media encoding and directly generate the outgoing frames 345. The media content for the media stream may be provided, without limitation, by a capture component of the sending client device 320, such as may receive media content from a camera and/or microphone of the sending client device 320.

The communication client 310 may comprise an encoding configuration component 380. The encoding configuration component 380 determines the encoding settings for use by the media component 340. The encoding configuration component 380 may be generally arranged to determine the encoding settings based on network performance information 390 or 395 for the media stream. In some embodiments, encoding configuration component 380 of receiving client device 325 may determine the encoding settings based on encoding information of outgoing network packets 365, for example, provided in a header of outgoing network packets 365.

The encoding configuration component 380 may, however, determine an initial sending configuration 385 independent of network performance information due to it not yet being available to the encoding configuration component 380 of the sending client device 320. In some embodiments, the initial sending configuration 385 may be a predefined initial sending configuration 385 configured for the communication client 310 independent of any network information. In other embodiments, the initial sending configuration 385 may be determined based on network information, such as network information indicating the bandwidth available on the network being used by the sending client device 320.

The sending client device 320 may be configured for dynamic encoder selection mode in which the sending client device 320 may dynamically select between a hardware encoder or a software encoder for encoding video to be transmitted to the receiving device 325 based on the sender network performance information 390. After the sending client device 320 establishes the streaming network connection with the receiving device 325 via communication clients 310, the sending client device 320 may transmit a message to the receiving client device 325 indicating that the sending client device may operate using dynamic encoder selection mode. The receiving client device 325 may transmit a response to the sending client device 325 indicating whether the receiving client device 325 is capable of operating in a dynamic encoder selection mode and whether the dynamic encoder selection mode is accepted.

When operating in the dynamic encoder selection mode, the sending client device 320 may generate a video stream at the sending client device 320 at a first video bitrate with a first video encoding codec. For example, media component 340 may generate the video stream using a hardware encoding component operative to encode the video at a first video bitrate using a first video encoding codec. In exemplary embodiments, the media component 340 may generate a media stream comprising the video stream and an audio stream. The video stream and/or the audio stream may be captured using various devices of the sending client device 320, such as a camera device, microphone device, and/or other sensors.

In some embodiments, the selection of the first video encoding codec may be determined based on the sender network performance information 390 for the video stream or the initial sending configuration 385, for instance, if there is no or insufficient sender network performance information 390 for the video stream. The sending client device 320 may send the video stream encoded with the first video encoding codec to the receiving client device, for example, via network component 360.

The sending client device 320 may receive network performance information 390 for the video stream. In some embodiments, the network performance information 390 may indicate a quality of the video stream, available bandwidth, bitrate, and/or the like. In general, the network performance information 390 may indicate an overall quality of the streaming user experience for the receiving client device 325 receiving the video stream. The sending client device 320 may evaluate the use of a video encoding codec at various intervals, for instance, based on a timed duration, a number of frames, a detected change in the quality of the video stream and/or available bandwidth.

The sending client device 320 may change the video encoding codec based on the network performance information 390. For example, in some embodiments, the sending client device 320 may determine a second video bitrate (or bitrate range) based on the network performance information 390 for the video stream. The media component 340 of the sending client device 320 may generate the video stream at the second video bitrate with a second video encoding codec. For example, the second video encoding codec may include a video encoding coded encoded using a software encoding component. The second video encoding codec may be used based on generating the video stream at the second video bitrate. The sending client device 320 may send the video stream from the sending client device 320 to the receiving client device 325 using the second video encoding codec. In embodiments in which the sending client device 320 generates a media stream, the sending client device may transmit the media stream to the receiving client device 325.

In some embodiments, the video encoding codec used by the media component 340 of the sending client device 320 may be determined based on a video codec selection policy. In exemplary embodiments, the video coded selection component may be stored on a server device, such as a messaging server device. The sending client device 320 and/or the receiving client device 325 may access or receive the video codec selection policy from the messaging server device responsive to establishing a connection or session between the sending client device and the receiving client device 325 (for instance, a video stream initiation). The video codec selection policy may be stored locally, for example, in a memory (not shown) of sending client device 320. In some embodiments, sending client device 320 and/or receiving client device 325 may provide the network performance information 390, 395 to the messaging server. In various embodiments, the video codec selection policy may be modified or updated based on the network performance information (for instance, to improve performance, prevent thrashing between video encoding codecs, and/or the like). In various embodiments, the sending client device 320 may determine a video encoding codec for encoding a video stream based, at least in part, on the video codec selection policy. In some embodiments, the encoding configuration component 380 may compare, analyze, or otherwise process the network performance information 390 based on the video codec selection policy to determine the video encoding codec to be used by the media component 340. For example, the media component 340 may generate the video stream at the sending client device 320 at the first video bitrate with the first video encoding codec, in which the first video encoding codec is used based on comparing the first video bitrate to the video codec selection policy. Alternatively, the media component 340 may generate the video stream at the sending client device 320 at the second video bitrate with the second video encoding codec, in which the second video encoding codec is used based on comparing the second video bitrate to the video codec selection policy.

In exemplary embodiments, the video codec selection policy may include one or more thresholds. For example, the thresholds may include video codec selection thresholds providing video bitrate thresholds or ranges. In some embodiments, the selection of a video encoding codec may be based on comparison of a video bitrate, for example, specified in the network performance information 390 to the video codec selection threshold. For instance, the encoding configuration component 380 may specify use of the second video encoding codec by the media component 340 based on a comparison of the second video bitrate to the video codec selection threshold. For example, the media component 340 may be instructed to generate the video stream at the second video bitrate with the second video encoding coded based on the second video bitrate exceeding the video codec selection threshold. In another example, the media component 340 may be instructed to generate the video stream at the second video bitrate with the second video encoding coded based on the second video bitrate being below the video codec selection threshold.

In some embodiments, the video stream may include a plurality of outgoing network packets 365, portions of which are encoded using different video encoding codecs. The outgoing network packets 365 may include video encoding codec identifiers to identify the video encoding codec used to encode the outgoing network packets 365. In some embodiments, the video encoding codec identifiers may be provided in headers of the outgoing network packets 365 (for instance, RTP headers). For example, the video stream may include a plurality of outgoing network packets 365 that include a plurality of first video encoding codec packets encoded with a first video encoding codec and marked with a first video encoding codec identifier corresponding to the first video encoding codec, and that also includes a plurality of second video encoding codec packets encoded with a second video encoding codec and marked with a second video encoding codec identifier corresponding to the second video encoding codec. The receiving client device 325 may determine the video encoding codec associated with each outgoing network packet 365 based on the video encoding codec identifiers and decode the outgoing network packets 365 using the corresponding decoder.

In various embodiments, the selection of a video encoding codec may be based on one or more encoding codec selection factors alone or in combination with the network performance information 390 and/or 395. Non-limiting examples of encoding codec selection factors may include device power conditions, such as a current power availability and/or a current video encoding power usage. For example, the media component 340 of the sending device 320 may generate the video stream at the sending client device 320 at the second video bitrate with the second video encoding codec selected based on generating the video stream at the second video bitrate and a current power availability for the sending client device 320 and/or a current video encoding power usage for the sending client device 320.

In some embodiments, the sending client device 320 and/or the receiving client device 325 may be in communication with a messaging server. In various embodiments, the messaging server may be operative to facilitate communication, video streaming, and/or selection of video encoding codecs and/or video codec selection policy. For instance, in exemplary embodiments, the messaging server may operate as the relay server 305. The messaging server may receive a video stream initiation between the sending client device 320 and the receiving client device 325. In response to receiving the video stream initiation, the messaging server may send or otherwise make available a video codec selection policy to the client sending device 320. In various embodiments, the client sending device 320 may use video codec selection policy for selecting a video encoding codec for encoding video.

The messaging server may receive a video stream from the sending client device 320. The video stream may be generated at the sending client device 320 at a first video bitrate with a first video encoding codec selected based on the video codec selection policy. The messaging server may send the video stream to the receiving client device 325.

The video stream may be received at the messaging server from the sending client device 320 generated at the sending client device 320 at a second video bitrate with a second video encoding codec, the second video encoding codec selected based on the video codec selection policy. The messaging server may send the video stream to the receiving client device 325, in which the video stream uses the second video encoding codec selected based on the video codec selection policy.

In various embodiments, video stream duration information may be generated for the video stream between the sending client device 320 and the receiving client device 325. In some embodiments, the sending client device 320, the receiving client device, and/or the messaging server may receive or otherwise access the video stream duration information. A video stream performance repository may be operative to store information associated with the video stream. The video stream performance repository may be stored on the sending client device 320, the receiving client device, and/or the messaging server. The video stream duration information may be logged, stored, or otherwise recorded in the video stream performance repository. In various embodiments, the video selection policy may be modified based on the information stored in the video stream performance repository. For example, the video codec selection policy may be modified based on analyzing the video stream performance repository based on increasing video stream duration.

In exemplary embodiments, a plurality of video codec selection policies may be accessible for use in selecting the video encoding codec. For example, messaging server may store a plurality of video codec selection policies for one or more configurations, such as client device type, video type, bitrate, network type, operating system, streaming application, network performance, operating environment, and/or the like. For example, the sending client device 320 may access and/or the messaging server may receive encoding device information for the sending client device 320. In general, encoding device information may include information associated with the computing environment of a client device that may be used in selection of a video codec selection policy. Non-limiting examples of encoding device information may include device ID, device type (for instance, smartphone, personal computer (PC), tablet computing device), operating environment (for instance, operating system, processor speed, network interface information), streaming application, and/or the like. In some embodiments, a video codec selection policy may be selected from the plurality of video codec selection policies based on the encoding device information. For instance, a first video codec selection policy may be selected for device operating a first operating system, while a second video codec selection policy may be selected for a device operating a second operating system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 4A illustrates one embodiment of a logic flow 400A. The logic flow 400A may be representative of some or all of the operations executed by one or more embodiments described herein.

In the illustrated embodiment shown in FIG. 4A, the logic flow 400A may generate a video stream at a sending device at a first video bitrate with a first video encoding codec at block 402. For example, the media component 340 of the sending client device 320 may generate a video stream at the sending client device 320 at a first video bitrate with a first video encoding codec.

The logic flow 400A may send the video stream from the sending device to a receiving device at block 404. For example, the sending client device 320 may send the video stream from the sending client device 320 to the receiving client device 325 using the network component 360.

The logic flow 400A may receive network performance information for the video stream at block 406. For example, the sending client device 320 may receive network performance information 390 for the video stream. In some embodiments, the network performance information 390 may indicate a bitrate of the video stream or other measure of the quality of the video stream.

The logic flow 400A may determine a second video bitrate based on the network performance information for the video stream at block 408. For example, in some embodiments, the sending client device 320 may determine a second video bitrate (or bitrate range) based on the network performance information 390 for the video stream.

The logic flow 400A may generate the video stream at the sending device at the second video bitrate with a second video encoding codec, wherein the second video encoding codec is used based on generating the video stream at the second video bitrate at block 410. For example, the media component 340 of the sending client device 320 may generate the video stream at the second video bitrate with a second video encoding codec.

The logic flow 400A may send the video stream from the sending device to the receiving device using the second video encoding codec at block 412. For example, the sending client device 320 may send the video stream from the sending client device 320 to the receiving client device 325 using the second video encoding codec.

FIG. 4B illustrates one embodiment of a logic flow 400B. The logic flow 400B may be representative of some or all of the operations executed by one or more embodiments described herein In the illustrated embodiment shown in FIG. 4B, the logic flow 400B may receive a video stream initiation between a sending device and a receiving device at a messaging server device at block 422. For example, the messaging server may receive a video stream initiation between the sending client device 320 and the receiving client device 325.

The logic flow 400B may send a video codec selection policy from the messaging server device to the sending device at block 424. For example, in response to receiving the video stream initiation, the messaging server may send a video codec selection policy to the client sending device 320.

The logic flow 400B may receive a video stream at a messaging server device from the sending device, the video stream generated at the sending device at a first video bitrate with a first video encoding codec, the first video encoding codec selected based on the video codec selection policy at block 426. For example, the messaging server may receive a video stream from the sending client device 320. The video stream may be generated at the sending client device 320 at a first video bitrate with a first video encoding codec selected based on the video codec selection policy.

The logic flow 400B may send the video stream to a receiving device at block 428. For example, the messaging server may send the video stream to the receiving client device 325.

The logic flow 400B may receive a video stream at a messaging server device from the sending device, the video stream generated at the sending device at a second video bitrate with a second video encoding codec, the second video encoding codec selected based on the video codec selection policy at block 430. For example, the video stream may be received at the messaging server from the sending client device 320 generated at the sending client device 320 at a second video bitrate with a second video encoding codec, the second video encoding codec selected based on the video codec selection policy.

The logic flow 400B may send the video stream to the receiving device, the video stream using the second video encoding codec selected based on the video codec selection policy at block 432. For example, the messaging server may send the video stream to the receiving client device 325, in which the video stream uses the second video encoding codec selected based on the video codec selection policy The embodiments are not limited to these examples.

Figure 5:
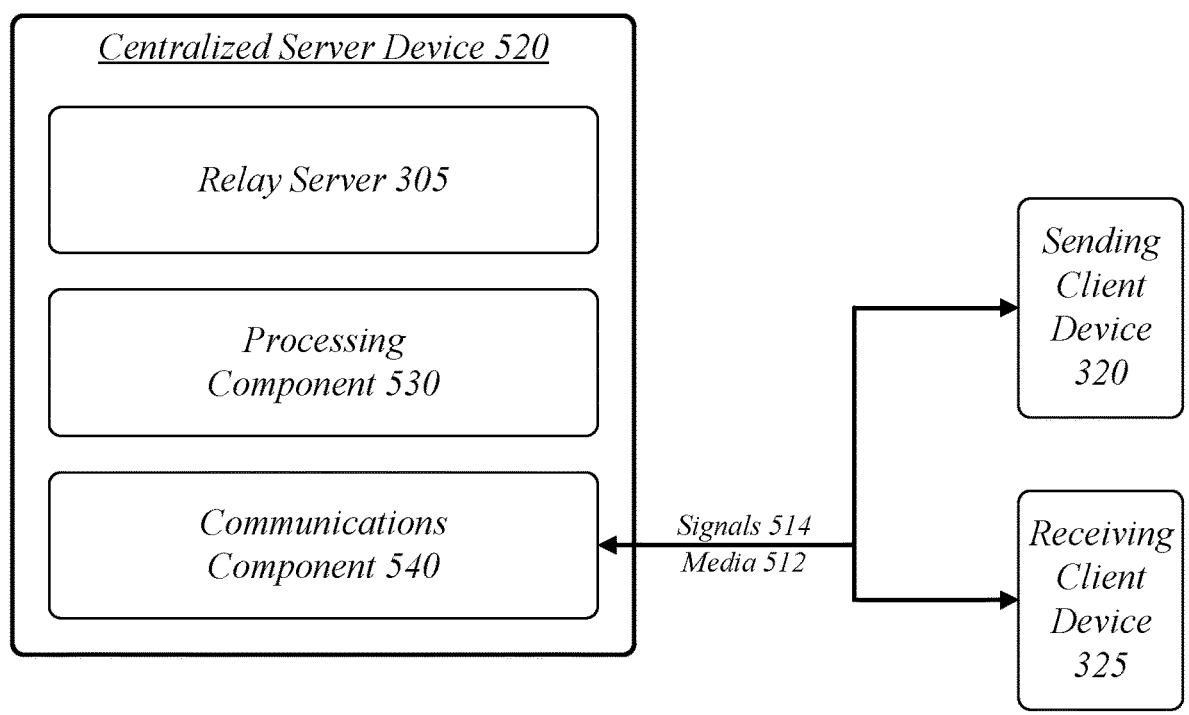
FIG. 5 illustrates an embodiment of a centralized system for the streaming media system of FIG. 1.

FIG. 5 illustrates a block diagram of a centralized system 500. The centralized system 500 may implement some or all of the structure and/or operations for the streaming media system 100 in a single computing entity, such as entirely within a single centralized server device 520.

The centralized server device 520 may comprise any electronic device capable of receiving, processing, and sending information for the streaming media system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 520 may execute processing operations or logic for the streaming media system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 520 may execute communications operations or logic for the streaming media system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 520 may communicate with other devices over a communications media 512 using communications signals 514 via the communications component 540. The centralized server device 520 may execute a relay server 305, the relay server 305 operative to assist in the performance of streaming network connections. The relay server 305 may receive and forward network packets between the sending client device 320 and receiving client device 325 as assistance to the performance of a streaming network connection, the receiving and forwarding of network packets comprising at least a portion of the signals 314 transmitted via media 312.

Figure 6:
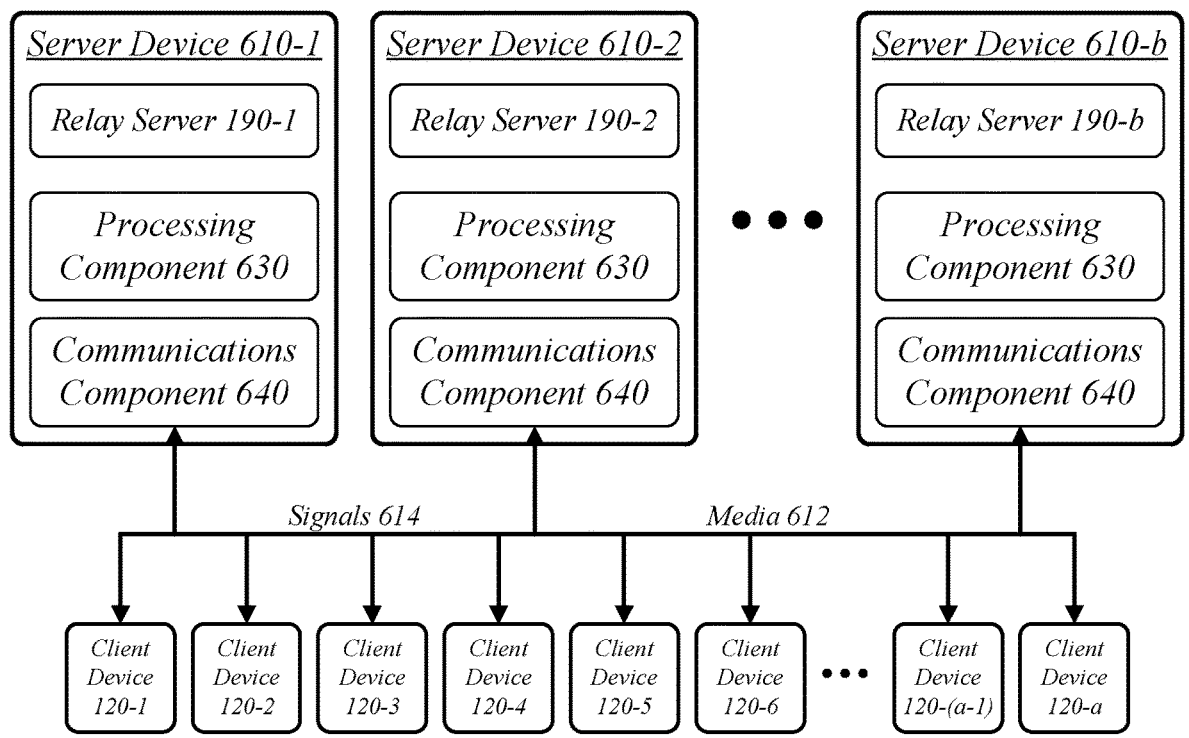
FIG. 6 illustrates an embodiment of a distributed system for the streaming media system of FIG. 1.

FIG. 6 illustrates a block diagram of a distributed system 600. The distributed system 600 may distribute portions of the structure and/or operations for the streaming media system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a plurality of server devices 610. In general, the server devices 610 may be the same or similar to the centralized server device 510 as described with reference to FIG. 5. For instance, the server devices 610, 650 may each comprise a processing component 630 and a communications component 640 which are the same or similar to the processing component 530 and the communications component 540, respectively, as described with reference to FIG. 5. In another example, the server devices 610, 650 may communicate over a communications media 612 using communications signals 614 via the communications components 640.

The server devices 610 may comprise or employ one or more programs that operate to perform various methodologies in accordance with the described embodiments. In one embodiment, for example, the server devices 610 may each implement a relay server of a plurality of relay servers 190, as described with reference to FIG. 1.

Figure 7:
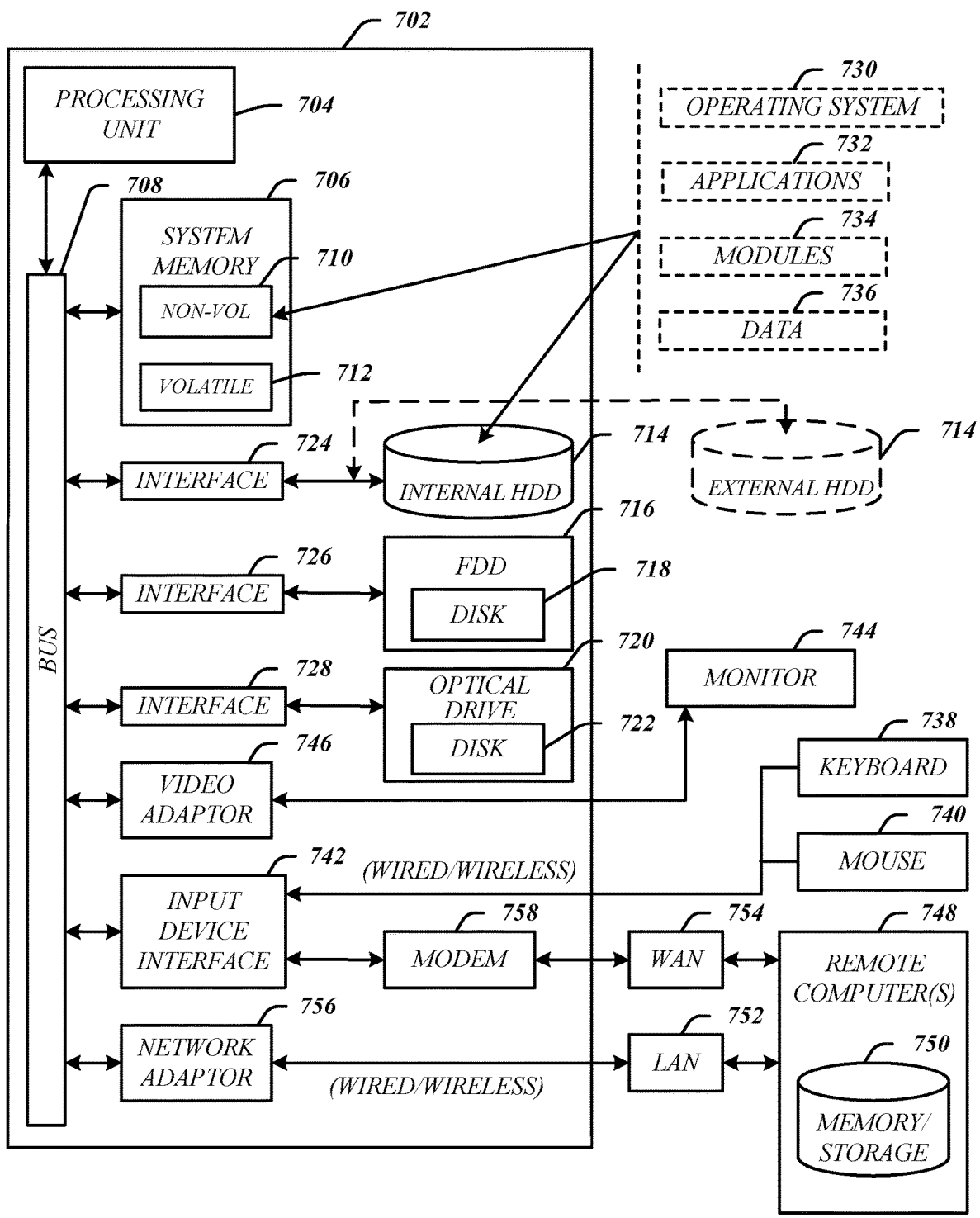
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
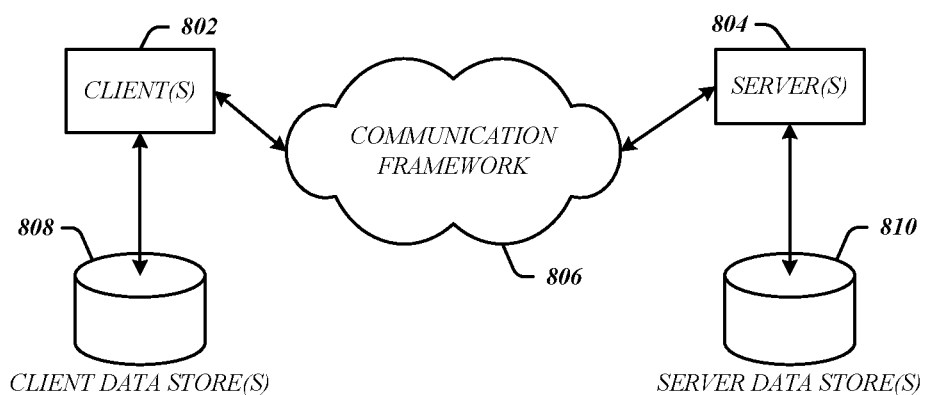
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client devices 120, 320, 325. The servers 804 may implement the relay servers 190, 305. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
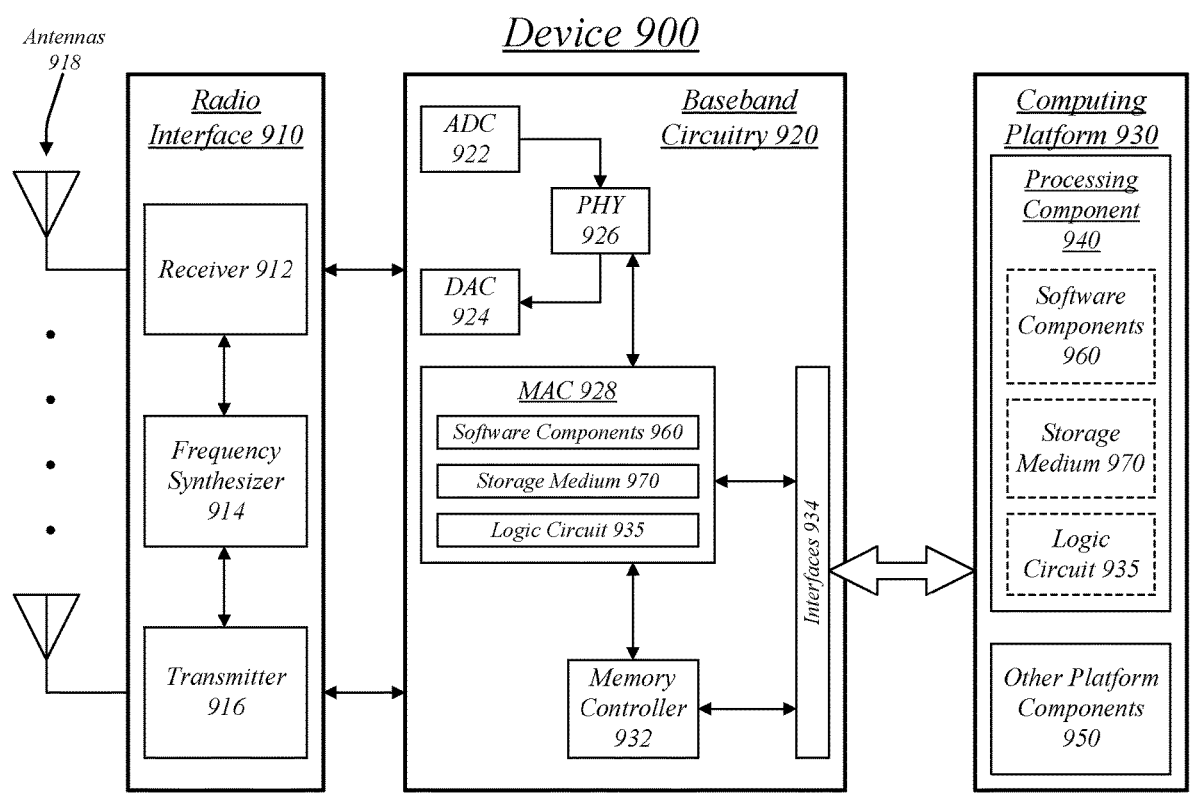
FIG. 9 illustrates an embodiment of a radio device architecture.

FIG. 9 illustrates an embodiment of a device 900 for use in a multicarrier OFDM system, such as the system 100. Device 900 may implement, for example, software components 960 as described with reference to system 100 and/or a logic circuit 935. The logic circuit 935 may include physical circuits to perform operations described for the system 100. As shown in FIG. 9, device 900 may include a radio interface 910, baseband circuitry 920, and computing platform 930, although embodiments are not limited to this configuration.

The device 900 may implement some or all of the structure and/or operations for the system 100 and/or logic circuit 935 in a single computing entity, such as entirely within a single device. Alternatively, the device 900 may distribute portions of the structure and/or operations for the system 100 and/or logic circuit 935 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 910 may include, for example, a receiver 912, a transmitter 916 and/or a frequency synthesizer 914. Radio interface 910 may include bias controls, a crystal oscillator and/or one or more antennas 918. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 956 for PHY link layer processing of respective receive/transmit signals. Baseband circuitry 920 may include, for example, a processing circuit 928 for medium access control (MAC)/data link layer processing. Baseband circuitry 920 may include a memory controller 932 for communicating with processing circuit 928 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames, such as radio frames. Alternatively or in addition, MAC processing circuit 928 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the system 100 and logic circuit 935 using the processing component 940. The processing component 940 (and/or PHY 926 and/or MAC 928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 902.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise generating a video stream at a sending device at a first video bitrate with a first video encoding codec; sending the video stream from the sending device to a receiving device; receiving network performance information for the video stream; determining a second video bitrate based on the network performance information for the video stream; generating the video stream at the sending device at the second video bitrate with a second video encoding codec, wherein the second video encoding codec is used based on generating the video stream at the second video bitrate; and sending the video stream from the sending device to the receiving device using the second video encoding codec A computer-implemented method may further comprise receiving a video stream initiation between a sending device and a receiving device at a messaging server device; sending a video codec selection policy from the messaging server device to the sending device; receiving a video stream at a messaging server device from the sending device, the video stream generated at the sending device at a first video bitrate with a first video encoding codec, the first video encoding codec selected based on the video codec selection policy; sending the video stream to a receiving device; receiving a video stream at a messaging server device from the sending device, the video stream generated at the sending device at a second video bitrate with a second video encoding codec, the second video encoding codec selected based on the video codec selection policy; and sending the video stream to the receiving device, the video stream using the second video encoding codec selected based on the video codec selection policy.

An apparatus may comprise an encoding configuration component operative to receive network performance information for a video stream at a sending device, the video stream at a first video bitrate with a first video encoding codec; and assign a second video bitrate with a second video encoding codec to a media component based on the network performance information, wherein the second video encoding codec is used based on generating the video stream at the second video bitrate; the media component operative to generate the video stream at the sending device at the second video bitrate with the second video encoding code; and the network component operative to send the video stream from the sending device to the receiving device using the second video encoding codec. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium comprising instructions that, when executed, cause a system to:
   generate a video stream at a sending device at a first video bitrate with a first video encoding codec;
   send the video stream from the sending device to a receiving device;
   receive network performance information comprising one or more of a quality of the video stream, an available network bandwidth, or a network bitrate at a point in time for the video stream;
   receive a video codec selection policy from a messaging server device, the video codec selection policy defining video codec selection thresholds and corresponding video encoding codecs to be used at the respective video codec selection thresholds;
   determine a target video bitrate or target video bitrate range at which the video stream is to be encoded, the target video bitrate or target video bitrate range representing a maximum limit for the encoding of media content and being computed based on the network performance information for the video stream;
   compare the target video bitrate or target video bitrate range to the video codec selection thresholds of the video codec selection policy to select a second video encoding codec configured to encode the video stream at a rate approaching the target video bitrate, the second video encoding codec being a different codec from the first video encoding codec in the codec selection policy;
   generate the video stream at the sending device with the second video encoding codec; and
   send the video stream from the sending device to the receiving device using the second video encoding codec.

2. The computer-readable storage medium of claim 1, the video codec selection policy received from the messaging server device in response to a video stream initiation between the sending device and receiving device.

3. The computer-readable storage medium of claim 1, the video codec selection policy comprising a video codec selection threshold, wherein the second video encoding codec is used based on comparing the target video bitrate to the video codec selection threshold.

4. The computer-readable storage medium of claim 1, comprising further instructions that, when executed, cause a system to:
   generate the video stream at the sending device at the target video bitrate with the second video encoding codec based on the target video bitrate exceeding a video codec selection threshold.

5. The computer-readable storage medium of claim 1, comprising further instructions that, when executed, cause a system to:
   generate the video stream at the sending device at the target video bitrate with the second video encoding codec based on the target video bitrate being below a video codec selection threshold.

6. The computer-readable storage medium of claim 1, comprising further instructions that, when executed, cause a system to:
   send the network performance information to a messaging server.

7. The computer-readable storage medium of claim 1, the video stream comprising a plurality of packets, wherein first video encoding codec packets of the plurality of packets are marked with a first video encoding codec identifier corresponding to the first video encoding codec, wherein second video encoding codec packets of the plurality of packets are marked with a second video encoding codec identifier corresponding to the second video encoding codec.

8. The computer-readable storage medium of claim 1, comprising further instructions that, when executed, cause a system to:
   generate the video stream at the sending device at the target video bitrate with the second video encoding codec, wherein the second video encoding codec is used based on generating the video stream at the target video bitrate and one or more of a current power availability for the sending device and a current video encoding power usage for the sending device.

9. An apparatus, comprising:
   a network component operative to receive a video codec selection policy from a messaging server device;
   an encoding configuration component operative to receive network performance information comprising one or more of a quality of the video stream, an available network bandwidth, or a network bitrate at a point in time for a video stream at a sending device, the video stream encoded at a first video bitrate with a first video encoding codec, to determine a target video bitrate or target video bitrate range at which the video stream is to be encoded, the target video bitrate or target video bitrate range representing a maximum limit for the encoding of media content and being computed based on the network performance information for the video stream, and to compare the target video bitrate or target video bitrate range to the video codec selection thresholds of the video codec selection policy to select a second video encoding codec configured to encode the video stream at a rate approaching to the target video bitrate, the second video encoding codec being a different codec from the first video encoding codec in the codec selection policy; and
   a media component operative to generate the video stream at the sending device with the second video encoding codec; wherein
   the network component is further operative to send the video stream from the sending device to the receiving device.

10. The apparatus of claim 9, the video codec selection policy received from the messaging server device in response to a video stream initiation between the sending device and receiving device.

11. The apparatus of claim 9, wherein the encoding configuration component is further operative to assign the target video bitrate with the second video encoding codec to the media component based on the target video bitrate exceeding a video codec selection threshold.

12. The apparatus of claim 9, wherein the encoding configuration component operative is further configured to assign the target video bitrate with the second video encoding codec to the media component based on the target video bitrate being below a video codec selection threshold.

13. The apparatus of claim 9, the video stream comprising a plurality of packets, wherein first video encoding codec packets of the plurality of packets are marked with a first video encoding codec identifier corresponding to the first video encoding codec, wherein second video encoding codec packets of the plurality of packets are marked with a second video encoding codec identifier corresponding to the second video encoding codec.

14. The apparatus of claim 9, wherein the media component is further operative to generate the video stream at the sending device at the target video bitrate with the second video encoding codec, wherein the second video encoding codec is used based on generating the video stream at the target video bitrate and one or more of a current power availability for the sending device and a current video encoding power usage for the sending device.

15. A computer-implemented method, comprising:
receiving a video stream initiation between a sending device and a receiving device at a messaging server device;
sending a video codec selection policy from the messaging server device to the sending device, the video codec selection policy defining video codec selection thresholds and corresponding video encoding codecs to be used at the respective video codec selection thresholds;
receiving a video stream at the messaging server device from the sending device, the video stream generated at the sending device at a first video bitrate with a first video encoding codec, the first video encoding codec selected based on the video codec selection policy;
sending the video stream to a receiving device;
receiving a video stream at a messaging server device from the sending device, the video stream generated at the sending device by determining a target video bitrate or target video bitrate range at which the video stream is to be encoded, the target video bitrate or target video bitrate range representing a maximum limit for the encoding of media content and being computed based on the network performance information comprising one or more of a quality of the video stream, an available network bandwidth, or a network bitrate at a point in time for the video stream, comparing the target video bitrate or target video bitrate range to the video codec selection thresholds of the video codec selection policy to select a second video encoding codec configured to encode the video stream at a rate approaching the target video bitrate, the second video encoding codec being a different codec from the first video encoding codec in the codec selection policy, and applying the second video encoding codec; and
sending the video stream to the receiving device, the video stream using the second video encoding codec selected based on the video codec selection policy.

16. The method of claim 15, further comprising:
receiving video stream duration information for the video stream between the sending device and the receiving device;
logging the video stream duration information in a video stream performance repository; and
modifying the video codec selection policy based on analyzing the video stream performance repository based on increasing video stream duration.

17. The method of claim 15, further comprising:
receiving encoding device information for the sending device; and
selecting the video codec selection policy from a plurality of video codec selection policies based on the received encoding device information for the sending device.

18. The method of claim 15, the video stream comprising a plurality of packets, wherein first video encoding codec packets of the plurality of packets are marked with a first video encoding codec identifier corresponding to the first video encoding codec, wherein second video encoding codec packets of the plurality of packets are marked with a second video encoding codec identifier corresponding to the second video encoding codec.

19. The medium of claim 1, wherein the video codec selection policy is one of a plurality of video codec selection policies stored at the messaging server device, each of the plurality of video codec selection policies being associated with encoding device information, and wherein the video codec selection policy is received in response to a determination that a configuration of the sending device matches the encoding device information of the received video codec selection policy.

20. The apparatus of claim 9, wherein the video codec selection policy is one of a plurality of video codec selection policies stored at the messaging server device, each of the plurality of video codec selection policies being associated with encoding device information, and wherein the video codec selection policy is received in response to a determination that a configuration of the sending device matches the encoding device information of the received video codec selection policy.

21. The method of claim 15, further comprising selecting the video codec selection policy from among a plurality of video codec selection policies stored at the messaging server device, each of the plurality of video codec selection policies being associated with encoding device information, and wherein the video codec selection policy is sent to the sending device in response to a determination that a configuration of the sending device matches the encoding device information of the selected video codec selection policy.

* * * * *